United States Patent
Miyahara et al.

(10) Patent No.: US 12,244,524 B2
(45) Date of Patent: Mar. 4, 2025

(54) OPTIMIZATION FUNCTION GENERATION APPARATUS, OPTIMIZATION FUNCTION GENERATION METHOD, AND PROGRAM

(71) Applicant: NIPPON TELEGRAPH AND TELEPHONE CORPORATION, Tokyo (JP)

(72) Inventors: Kazuhiro Miyahara, Tokyo (JP); Keitaro Horikawa, Tokyo (JP); Kinya Tomita, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 345 days.

(21) Appl. No.: 17/797,077

(22) PCT Filed: Feb. 6, 2020

(86) PCT No.: PCT/JP2020/004544
§ 371 (c)(1),
(2) Date: Aug. 2, 2022

(87) PCT Pub. No.: WO2021/157008
PCT Pub. Date: Aug. 12, 2021

(65) Prior Publication Data
US 2023/0049956 A1    Feb. 16, 2023

(51) Int. Cl.
*G06N 10/60* (2022.01)
*H04L 5/00* (2006.01)

(52) U.S. Cl.
CPC ........... *H04L 5/0023* (2013.01); *G06N 10/60* (2022.01); *H04L 5/006* (2013.01)

(58) Field of Classification Search
CPC ....... H04L 5/0023; H04L 5/006; H04L 47/70; G06N 10/60
See application file for complete search history.

(56) References Cited

U.S. PATENT DOCUMENTS

| | | | |
|---|---|---|---|
| 6,912,232 B1 * | 6/2005 | Duffield | ................ H04L 47/822 370/231 |
| 2003/0009582 A1 * | 1/2003 | Qiao | ..................... H04L 47/825 709/239 |

(Continued)

OTHER PUBLICATIONS

A. Lucas (2014) "Ising formulations of many NP problems," frontiers in Physics, [online], [searched on Jan. 17, 2020], Internet <URL: https://www.frontiersin.org/articles/10.3389/fphy.2014.00005/full>.

(Continued)

*Primary Examiner* — Kenneth T Lam

(57) ABSTRACT

Provided is a technology for creating an optimization function for solving a bandwidth allocation plan problem for determining bandwidths to be allocated for respective paths under various constraints regarding the paths for which bandwidths are to be allocated, the optimization function relating to a variable that represents a quantum state. The technology includes: an input setting unit that sets a set Path of paths, a set Edge of edges, a maximum bandwidth Max, a bandwidth p.bandwidth required by a path p, and a set e.paths of paths that include an edge e, as input to a bandwidth allocation plan problem for creating a bandwidth allocation plan for paths so as to satisfy a condition of minimizing a bandwidth allocated for the paths of the set Path as a whole under a predetermined constraint condition; and an optimization function creation unit that creates the optimization function using the input.

8 Claims, 5 Drawing Sheets

(56) References Cited

U.S. PATENT DOCUMENTS

2019/0164079 A1* 5/2019 Gambetta ............... G06N 5/01
2020/0228264 A1* 7/2020 Kreienkamp ......... H04L 1/0009

OTHER PUBLICATIONS

D-Wave Systems Inc, "The D-Wave 2000QTM Quantum Computer Technology Overview," [online], [searched on Jan. 17, 2020], Internet <URL: https://www.dwavesys.com/sites/default/files/D-Wave%202000Q%20Tech%20Collateral_1029F.pdf>.
Inagaki et al. (2016) "A coherent Ising machine for 2000-node optimization problems," Science, vol. 354, Issue 6312, pp. 603-606.
Yoshimura, et al. (2019) "An efficient Ising model mapping method to solve induced subgraph isomorphism problems using Ising machines," Adiabatic Quantum Computing Conference.

\* cited by examiner

PATH SET Path

| PATH ID | bandwidth |
|---------|-----------|
| 0 | 49 |
| 1 | 17 |
| 2 | 81 |
| 3 | 81 |
| 4 | 33 |
| 5 | 33 |
| 6 | 33 |

EDGE SET Edge

| EDGE NAME | paths |
|-----------|-------|
| A-B | {0, 3} |
| A-C | {0, 5} |
| B-D | {3, 4} |
| C-D | {5, 6} |
| C-E | {0, 1, 6} |
| D-F | {3, 4} |
| E-F | {2, 4, 6} |

MAXIMUM BANDWIDTH Max=327

Fig. 1

| PATH ID | PATH |
|---|---|
| 0 |  |
| 1 |  |
| 2 |  |
| 3 |  |
| 4 |  |
| 5 |  |
| 6 |  |

LOWER LIMIT bottom(p) OF ALLOCATED BANDWIDTH

| PATH ID | bottom(p) |
|---|---|
| 0 | 84 |
| 1 | 50 |
| 2 | 34 |
| 3 | 3 |
| 4 | 115 |
| 5 | 45 |
| 6 | 1 |

Fig. 3

| | t | | | | | | | | | |
|---|---|---|---|---|---|---|---|---|---|---|
| | 0 | 1 | 2 | 3 | 4 | 5 | 6 | 7 | 8 | 9 |
| $X_{p,b}$ | 0 | 0 | 0 | 0 | 1 | 1 | 1 | 1 | 1 | 1 |
| $X_{p,b-p.bandwidth}$ | 0 | 0 | 0 | 0 | 0 | 0 | 1 | 1 | 1 | 1 |
| $X_{p,b}-X_{p,b-p.bandwidth}$ | 0 | 0 | 0 | 0 | 1 | 1 | 0 | 0 | 0 | 0 |

Fig. 4

OPTIMIZATION FUNCTION GENERATION APPARATUS, OPTIMIZATION FUNCTION GENERATION METHOD, AND PROGRAM

CROSS-REFERENCE TO RELATED APPLICATIONS

This application is a U.S. National Stage Application filed under 35 U.S.C. § 371 claiming priority to International Patent Application No. PCT/JP2020/004544, filed on 6 Feb. 2020, the disclosure of which is hereby incorporated herein by reference in its entirety.

TECHNICAL FIELD

The present invention relates to a technology for creating an optimization function for solving a combination optimization problem using a quantum computer.

BACKGROUND ART

It is thought difficult to efficiently solve a combination optimization problem with use of a von Neumann type computer that is currently widely used. Therefore, in recent years, research and development are made on quantum annealing machines and Ising machines, which are computers that can solve a combination optimization problem more efficiently than a von Neumann type computer.

These new computers can calculate a solution of a target combination optimization problem at high speed by taking, as input, an optimization function with which the combination optimization problem is expressed as an objective function of QUBO (Quadratic Unconstrained Binary Optimization) or an Ising Hamiltonian.

Conventionally, methods for designing a graph partitioning problem, a graph clique problem, and a graph isomorphism problem as objective functions of QUBO or Ising Hamiltonians are devised (see NPLs 1, 2, 3, and 4).

CITATION LIST

Non Patent Literature

[NPL 1] A. Lucas, "Ising formulations of many NP problems," frontiers in Physics (2014), [online], [searched on Jan. 17, 2020], Internet <URL: https://www.frontiersin.org/articles/10.3389/fphy.2014.00005/full>
[NPL 2] D-Wave Systems Inc, "The D-Wave 2000Q™ Quantum Computer Technology Overview," [online], [searched on Jan. 17, 2020], Internet <URL: https://www.dwavesys.com/sites/default/files/D-Wave%202000Q%20Tech%20Collateral_1029F.pdf>
[NPL 3] Takahiro Inagaki et al., "A coherent Ising machine for 2000-node optimization problems," Science, vol. 354, Issue 6312, pp. 603-606, 2016.
[NPL 4] N. Yoshimura, M. Tawada, S. Tanaka, J. Arai, S. Yagi, H. Uchiyama, and N. Togawa, "An efficient ising model mapping method to solve induced subgraph isomorphism problems using ising machines," Adiabatic Quantum Computing Conference 2019.

SUMMARY OF THE INVENTION

Technical Problem

A bandwidth allocation plan problem for determining bandwidths to be allocated for respective paths under various constraints regarding the paths for which bandwidths are to be allocated is one of combination optimization problems, and accordingly, it is expected that a solution of the bandwidth allocation plan problem can be found at high speed using a quantum annealing machine or an Ising machine. However, NPLs 1 to 4 only disclose objective functions of QUBO and Ising Hamiltonians for solving specific problems related to graphs, and an objective function of QUBO and an Ising Hamiltonian for the bandwidth allocation plan problem described above are unknown.

Therefore, an object of the present invention is to provide a technology for creating an optimization function for solving a bandwidth allocation plan problem for determining bandwidths to be allocated for respective paths under various constraints regarding the paths for which bandwidths are to be allocated, the optimization function relating to a variable that represents a quantum state.

Means for Solving the Problem

An aspect of the present invention includes: an input setting unit configured to set a set Path of paths, a set Edge of edges, a maximum bandwidth Max, a bandwidth p.bandwidth required by a path p($\in$Path), and a set e.paths($\subseteq$Path) of paths that include an edge e($\in$Edge), as input to a bandwidth allocation plan problem for creating a bandwidth allocation plan for paths so as to satisfy a condition (hereinafter referred to as an "optimization condition") of minimizing a bandwidth allocated for the paths of the set Path as a whole under a predetermined constraint condition; and an optimization function creation unit configured to create an optimization function for solving the bandwidth allocation plan problem using the input, the optimization function relating to a variable that represents a quantum state.

Effects of the Invention

According to the present invention, it is possible to create an optimization function for solving a bandwidth allocation plan problem on which a predetermined constraint condition is imposed, the optimization function relating to a variable that represents a quantum state.

BRIEF DESCRIPTION OF DRAWINGS

FIG. 1 is a diagram showing an example of input to a bandwidth allocation plan problem.
FIG. 3 is a diagram showing an example of output of the bandwidth allocation plan problem.
FIG. 4 is a diagram showing $x_{p,b}-x_{p,b-p.bandwidth}$ for the case where p.bandwidth=2.

DESCRIPTION OF EMBODIMENTS

Figure 2:
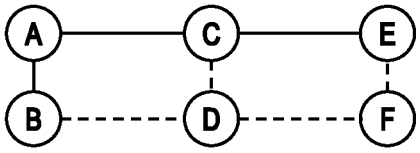
FIG. 2 is a diagram showing an example of a relationship between paths and edges.
Figure 2:
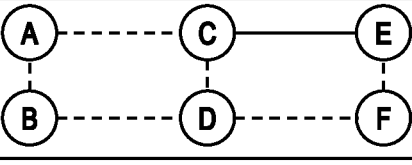
Figure 2:
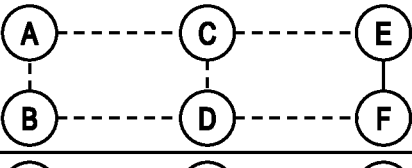
Figure 2:
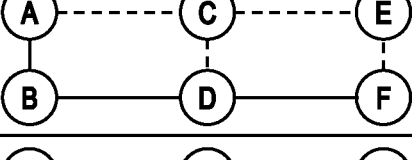
Figure 2:
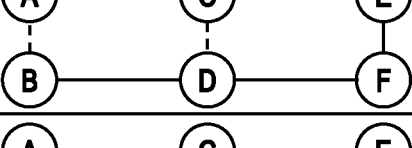
Figure 2:
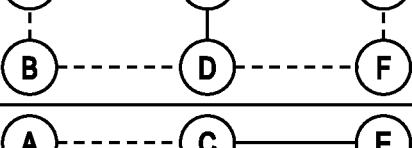
Figure 2:
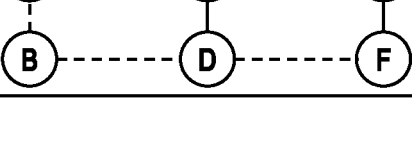

The following describes an embodiment of the present invention in detail. It should be noted that constitutional units that have the same function are denoted with the same number, and overlapping descriptions thereof are omitted.

Before describing the embodiment, notation in the present specification will be explained.

^(caret) indicates a superscript. For example, $x^{y^z}$ indicates that $y^z$ is the superscript of x, and indicates that $y^z$ is the subscript of x. _ (underscore) indicates a subscript. For example, $x^{y\_z}$ indicates that $y_z$ is the superscript of x, and $x_{y\_z}$ indicates that $y_z$ is the subscript of x.

Superscripts of a letter x, such as "^" and "~" in ^x and ~x, are to be written directly above "x", but these are written as ^x and ~x due to constraints of notation in the specification.

TECHNICAL BACKGROUND

A combination optimization problem treated in the embodiment of the present invention is a bandwidth allocation plan problem for creating a bandwidth allocation plan for paths so as to satisfy a condition (hereinafter referred to as an "optimization condition") of minimizing the bandwidth allocated for the paths as a whole under a predetermined constraint condition. Here, the predetermined constraint condition is a "constraint regarding edge overlapping". The following describes the "constraint regarding edge overlapping".

(1) Constraint Regarding Edge Overlapping

The constraint regarding edge overlapping is a condition that paths that include the same edge do not share the same band.

Next, input and output of the bandwidth allocation plan problem will be described.

(1) Input

The following are input to the bandwidth allocation plan problem.

A set Path (hereinafter referred to as a "path set") of paths for which the plan is to be created.

A set Edge (hereinafter referred to as an "edge set") of edges that constitute the paths.

A value Max (hereinafter referred to as the "maximum bandwidth", Max is a predetermined constant) that must not be exceeded by upper limits of bandwidths (allocated bandwidths) that are allocated for the paths.

Also, the following value is input with respect to each path p∈P.

A bandwidth (required bandwidth) p.bandwidth∈N (N represents a set of natural numbers) required by the path p.

Also, the following value is input with respect to each edge e∈Edge.

A set e.paths⊆Path of paths that include the edge e.

The maximum bandwidth Max can be set to the sum of required bandwidths of all paths included in the path set Path, for example. In this case, it is possible to avoid a situation where there is no solution for the bandwidth allocation plan problem.

(2) Output

The following is output of the bandwidth allocation plan problem.

The lower limit bottom(p) of an allocated bandwidth of each path p∈ Path.

It should be noted that the required bandwidth p.bandwidth has been provided with respect to each path p, and accordingly, the upper limit of the allocated bandwidth can be found using the following formula "bottom(p)+p.bandwidth−1".

The bottom(p) satisfies the following conditions (a), (b), and (c).

(a) Constraint Regarding Allocated Bandwidth

A constraint regarding the allocated bandwidth is a condition that the upper limit of the bandwidth allocated for each path does not exceed the maximum bandwidth Max, and can be expressed as follows.

$$\text{bottom}(p)+p.\text{bandwidth}-1 \leq \text{Max}$$

(b) Constraint Regarding Edge Overlapping

As described above, the constraint regarding edge overlapping is a condition that paths that include the same edge do not share the same band, and can be expressed as follows.

$$|\{p \in e.\text{paths} | \text{bottom}(p) \leq b < \text{bottom}(p)+p.\text{bandwidth}\}| \leq 1 \text{ holds true for } 1 \leq b \leq \text{Max},$$

(|S| represents the number of elements of a set S).

(c) Optimization Condition

As described above, the optimization condition is a condition of minimizing the bandwidth allocated for the paths of the set Path as a whole, and can be expressed as follows.

$$\text{minimize } (|\{b \in N | \text{ with respect to the band } b, \text{ there is } a \text{ path } p \in \text{Path for which bottom}(p) \leq b < \text{bottom}(p)+p.\text{bandwidth is satisfied}\}|)$$

FIG. 1 shows an example of input to the bandwidth allocation plan problem. FIG. 2 shows a relationship between the paths and the edges shown in FIG. 1. FIG. 3 shows an example of output of the bandwidth allocation plan problem.

A quantum bit that is used to solve the bandwidth allocation plan problem will be described. Here, the quantum bit is a variable that takes a value 1 or 0 and represents a quantum state. That is, in the bandwidth allocation plan problem treated in the present invention, the quantum bit $x_{p,b}$ is defined as follows.

$x_{p,b}$: "1" in a case where the band b is higher than or equal to the lower limit of the bandwidth (allocated bandwidth) allocated for the path p, and otherwise "0". However, this applies when p∈Path and $1 \leq b \leq \text{Max}-p.\text{bandwidth}$ are satisfied. $x_{p,b}$ is a constant "1" in the case where $b > \text{Max}-p.\text{bandwidth}$.

As a result of $x_{p,b}$ being defined as the constant "1" for the case where $b > \text{Max}-p.\text{bandwidth}$, the constraint regarding the allocated bandwidth will be satisfied. It should be noted that, by using the symbol ⇔ of equivalence, the definition of the quantum bit $x_{p,b}$ can also be expressed as "$x_{p,b}=1 \Leftrightarrow$ the band b is higher than or equal to the lower limit of the allocated bandwidth of the path p".

By using the quantum bit $x_{p,t}$ defined as described above, it is possible to express the range of an allocated bandwidth of a path. Specifically, the range of the allocated bandwidth of the path is expressed using $x_{p,b}-x_{p,b-p.bandwidth}$. Actually, the following holds true.

$x_{p,b}-x_{p,b-p.bandwidth}=1 \Leftrightarrow$ the band b is included in the range of the allocated bandwidth of the path p.

It should be noted that $x_{p,b}=0$ in the case where b<1. When a constant constraint is incorporated in the quantum bit $x_{p,b}$ as described above, a situation where the value of $x_{p,b-p.width}$ is indefinite is avoided.

FIG. 4 shows $x_{p,b}-x_{p,b-p.bandwidth}$ for the case where p.bandwidth=2.

Based on the above, the following describes an objective function of QUBO. Here, when the value of an expression that expresses a constraint is 0, the expression represents a state where the constraint is satisfied, and when the value of the expression is greater than 0, the expression represents a state where the constraint is not satisfied.

An objective function FlexGrid of QUBO can be defined using the following expression.

[Math. 1]

$$FlexGrid = \text{Penalty} * \text{Restriction} + \text{Optimization} \quad (1)$$

$$\text{Restriction} = \text{OverBottom} + \text{Conflict} \quad (2)$$

Here, Restriction is an expression that expresses conditions other than a minimization condition, Optimization is an expression that expresses the minimization condition, and Penalty is a constant that represents a weight of the expression Restriction. OverBottom is an expression that expresses a constraint for defining the meaning of the quantum bit $x_{p,b}$, and Conflict is an expression that expresses the constraint regarding edge overlapping.

Penalty can be set to 10000, for example. When the value of Penalty is extremely large compared to values that the expression Optimization expressing the minimization condition can take, tuning of the objective function FlexGrid of QUBO is performed with priority given to satisfying the expression Restriction.

The expression OverBottom expresses a constraint that "when the quantum bit $x_{p,b}$ has become "1" with respect to a band, the quantum bit $x_{p,b}$ will be "1" with respect to bands higher than that band". Due to this constraint, the band at which the quantum bit $x_{p,b}$ becomes "1" from "0" indicates the lower limit of the allocated bandwidth of the path p.

[Math. 2]

$$OverBottom = \sum_{1 \leq b < Max} \sum_{p \in Path} x_{p,b}(1 - x_{p,b+1}) \quad (3)$$

The expression (3) will be described. In expression $x_{p,b}(1-x_{p,b+1})$, $x_{p,b}$ is "1" when "$x_{p,b}=1$" holds true for the band b, and $1-x_{p,b+1}$ is "1" when "$x_{p,b+1}=0$" holds true for the band b+1. Accordingly, if the quantum bit $x_{p,b}$ changes from "1" to "0" when the band shifts from b to b+1, the constraint is violated. Therefore, the expression OverBottom expresses the constraint that "when the quantum bit $x_{p,b}$ has become "1" with respect to a band, the quantum bit $x_{p,b}$ will be "1" with respect to bands higher than that band".

(Variation)

In the case of OverBottom of the expression (3), penalty is determined only based on the number of points at which the constraint is violated, i.e., the number of points at which the quantum bit $x_{p,b}$ changes from "1" to "0", and this cannot lead to avoidance of constraint violation. Therefore, it is also possible to weight the expression $x_{p,b}(1-x_{p,b+1})$ as shown in the following expression OverBottom so that the closer it is to a state where "there is no violation of the constraint", the smaller the penalty becomes.

[Math. 3]

$$OverBottom = \sum_{1 \leq b < Max} \sum_{p \in Path} b * x_{p,b}(1 - x_{p,b+1}) \quad (3a)$$

The expression Conflict expresses the constraint regarding edge overlapping.

[Math. 4]

$$\text{Conflict} = \sum_{e \in Edge} \sum_{1 \leq b \leq Max} \text{Count}(e, b)(\text{Count}(e, b) - 1) \quad (4)$$

$$\text{Count}(e, b) = \sum_{p \in e.paths} (x_{p,b} - x_{p,b-p.bandwidth}) \quad (5)$$

Here, Count(e, b) represents the number of paths that include an edge e in the band b. This can be understood from the fact that $x_{p,b}-x_{p,b-p.bandwidth}=1$ indicates that the band b is included in the range of the allocated bandwidth of the path p.

The expression (4) will be described. Expression Count (e,b)(Count(e,b)−1) is "0" when the value of Count(e,b) is 0 or 1, and accordingly, when the value of Count (e,b) is 2 or more, the constraint is violated. Therefore, the expression Conflict expresses the constraint regarding edge overlapping.

The expression Optimization expresses "a total value of bands that are each allocated for at least one path".

[Math. 5]

$$\text{Optimization} = \sum_{1 \leq b \leq Max} \left( a_b + \sum_{p \in Path} (1 - a_b) x_{p,b} \right) \quad (6)$$

Here, $a_b$ is an auxiliary quantum bit that is used only in the expression Optimization.

The auxiliary quantum bit $a_b$ takes a value for minimizing expression $a_b+\Sigma(1-a_b)x_{p,b}$, and the expression $a_b+\Sigma(1-a_b)$ $x_{p,b}$ takes the value "1" when there is a path for which the band is allocated, and takes the value "0" when the band is not allocated for any path.

As described above, by using the quantum bit $x_{p,b}$ that is a variable that represents a particular state by taking the value 1 and represents a state other than the particular state by taking the value 0, the function OverBottom of the expression (3) (function OverBottom of the expression (3a)) and the function Conflict of the expression (4) are defined as functions that take the value 0 when the constraints expressed by the respective expressions are satisfied, and otherwise take values greater than 0, and the function Optimization of the expression (6) is defined as a function of which the value decreases as the total value of bands each allocated for at least one path decreases. Thus, the objective function FlexGrid of QUBO is designed so as to take the minimum value when the constraint expressed by the expression OverBottom and the constraint expressed by the expression Conflict are satisfied and the expression Optimization takes the minimum value. A solution of the objective function FlexGrid of QUBO can be found using a quantum annealing machine or an Ising machine.

First Embodiment

An optimization function creation apparatus 100 creates an optimization function for solving a bandwidth allocation plan problem, the optimization function relating to a variable that represents a quantum state. Here, the bandwidth allocation plan problem is a problem for creating a bandwidth allocation plan for paths so as to satisfy a condition (hereinafter referred to as an "optimization condition") of minimizing the bandwidth allocated for the paths of the set Path as a whole under a predetermined constraint condition. The predetermined constraint condition is the constraint regarding edge overlapping described in the technical background, i.e., the condition (hereinafter referred to as the "first constraint condition") that |{p∈e.paths|bottom(p) ≤b<bottom(p)+p.bandwidth}|≤1 (where bottom(p) represents the lower limit of the bandwidth allocated for the path p) is satisfied with respect to each band b up to the maximum bandwidth Max and each edge e∈Edge. Here, a quantum bit that represents a particular state by taking the value 1 and represents a state other than the particular state by taking the value 0 is used as the variable that represents a quantum state. Specifically, the quantum bit $x_{p,b}$ used here is defined so as to represent, with the value 1, a state where the band b is higher than or equal to the lower limit of the bandwidth allocated for the path p and represent a state other than that state with the value 0.

Figure 5:
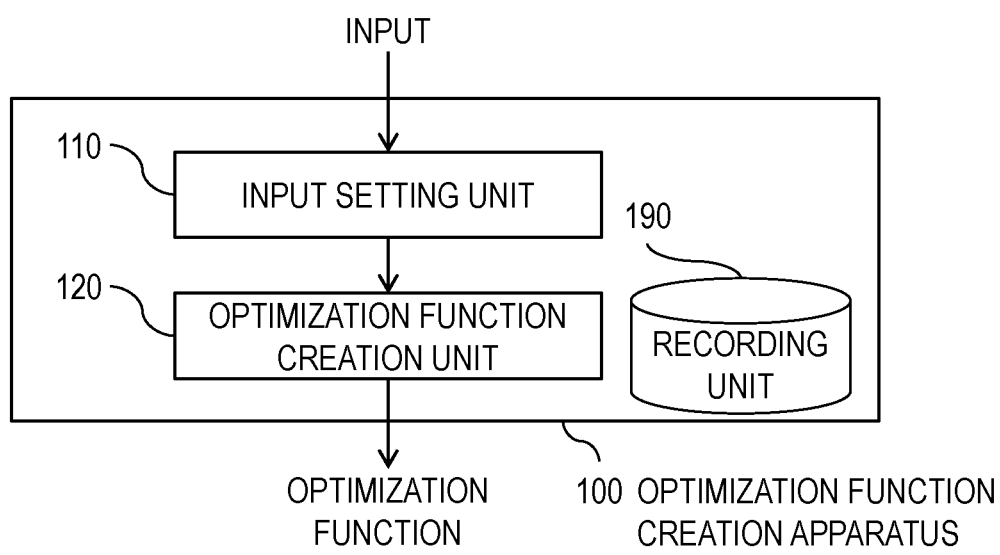
FIG. 5 is a block diagram showing a configuration of an optimization function creation apparatus 100.
Figure 6:
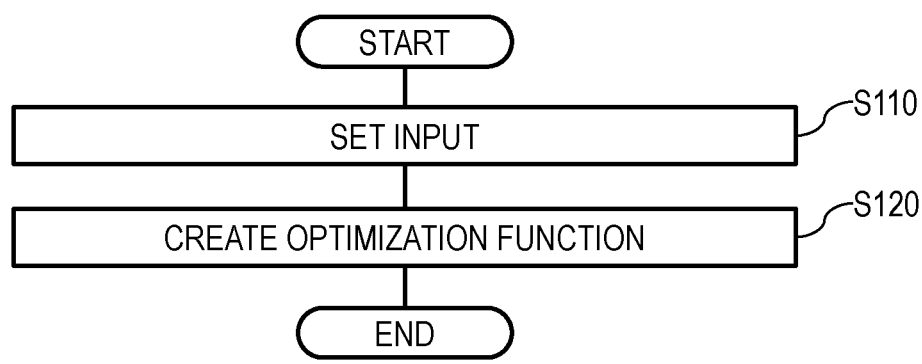
FIG. 6 is a flowchart showing operation of the optimization function creation apparatus 100.

The following describes the optimization function creation apparatus 100 with reference to FIGS. 5 and 6. FIG. 5 is a block diagram showing a configuration of the optimization function creation apparatus 100. FIG. 6 is a flowchart showing operation of the optimization function creation apparatus 100. As shown in FIG. 5, the optimization function creation apparatus 100 includes an input setting unit 110, an optimization function creation unit 120, and a recording unit 190. The recording unit 190 is a constitutional unit that records information necessary for processing performed in the optimization function creation apparatus 100, as appropriate.

Operation of the optimization function creation apparatus 100 will be described based on FIG. 6.

In step S110, the input setting unit 110 takes, as input, a set Path of paths, a set Edge of edges, the maximum bandwidth Max, a bandwidth p.bandwidth required by a path p(∈Path), and a set e.paths(⊆Path) of paths including an edge e(∈Edge), and sets these pieces of data as input to the bandwidth allocation plan problem.

In step S120, the optimization function creation unit 120 inputs the input to the bandwidth allocation plan problem set in step S110, creates an optimization function for solving the bandwidth allocation plan problem using the input, and outputs the optimization function. Here, the optimization function is a function that is defined using the quantum bit $x_{p,b}$, specifically, an objective function of QUBO defined based on a function that expresses the meaning of the quantum bit $x_{p,b}$, a function that expresses the first constraint condition, and a function that expresses the optimization condition.

The objective function of QUBO is the function FlexGrid expressed by the expression (1). The function expressing the meaning of the quantum bit $x_{p,b}$ is the function OverBottom expressed by the expression (3) or the function OverBottom expressed by the expression (3a). The function expressing the first constraint condition is the function Conflict expressed by the expression (4). The function expressing the optimization condition is the function Optimization expressed by the expression (6).

The function expressing the meaning of the quantum bit $x_{p,b}$ is defined so as to take the minimum value when the meaning of the quantum bit $x_{p,b}$ is expressed correctly. More specifically, the function takes the value 0 when the meaning of the quantum bit $x_{p,b}$ is expressed correctly, and otherwise takes a value greater than 0. The function expressing the first constraint condition is defined so as to take the minimum value when the first constraint condition is satisfied. More specifically, the function takes the value 0 when the first constraint condition is satisfied, and otherwise takes a value greater than 0. The function expressing the optimization condition is defined such that the value of the function decreases as the total value of bands each allocated for at least one path decreases.

Accordingly, the objective function FlexGrid of QUBO, which is the optimization function, is designed so as to take the minimum value when the first constraint condition is satisfied.

It should be noted that the objective function FlexGrid of QUBO is defined as a weighted sum of the function Restriciton of the expression (2) (i.e., function Restriction defined based on the function Overbottom expressing the meaning of the quantum bit $x_{p,b}$ and the function Conflict expressing the first constraint condition) and the function Optimization expressing the optimization condition. When the weight Penalty is set to a value that is large compared to values that the function Optimization can take, tuning of the objective function FlexGrid can be performed such that priority is given to correctly expressing the meaning of the quantum bit $x_{p,b}$ and satisfying the constraint regarding edge overlapping.

(Variation)

As the optimization function, an Ising Hamiltonian in which a spin is used can be used instead of the objective function of QUBO in which the quantum bit is used. Here, the spin is a variable that takes a value 1 or −1 and represents a quantum state. The spin s and the quantum bit x can be interconverted using expressions (7) and (8).

[Math. 6]

$$x = \frac{s+1}{2} \qquad (7)$$

$$s = 2x - 1 \qquad (8)$$

That is, when the value of the quantum bit is 1, the value of the spin is 1, and when the value of the quantum bit is 0, the value of the spin is −1.

In the following, the spin that represents a particular state by taking the value 1, and represents a state other than the particular state by taking the value −1 is used as the variable representing a quantum state. Specifically, the spin $s_{p,b}$ used here is defined so as to represent, with the value 1, a state where the band b is higher than or equal to the lower limit of the bandwidth allocated for the path p and represent a state other than that state with the value −1. In this case, the optimization function is a function defined using the spin $s_{p,b}$, specifically, an Ising Hamiltonian defined based on a function that expresses the meaning of the spin $s_{p,b}$, a function that expresses the first constraint condition, and a function that expresses the optimization condition.

The Ising Hamiltonian is a function that is obtained by applying the variable conversion shown above to the function FlexGrid expressed by the expression (1). The function expressing the meaning of the spin $s_{p,b}$ is a function obtained by applying the variable conversion shown above to the function OverBottom expressed by the expression (3) or the function OverBottom expressed by the expression (3a). The function expressing the first constraint condition is a function obtained by applying the variable conversion shown above to the function Conflict expressed by the expression (4). The function expressing the optimization condition is a function obtained by applying the variable conversion shown above to the function Optimization expressed by the expression (6).

The function expressing the meaning of the spin $s_{p,b}$ is defined so as to take the minimum value when the meaning of the spin $s_{p,b}$ is expressed correctly. More specifically, the function takes the value 0 when the meaning of the spin $s_{p,b}$ is expressed correctly, and otherwise takes a value greater than 0. The function expressing the first constraint condition is defined so as to take the minimum value when the first constraint condition is satisfied. More specifically, the function takes the value 0 when the first constraint condition is satisfied, and otherwise takes a value greater than 0. The function expressing the optimization condition is defined such that the value of the function decreases as the total value of bands each allocated for at least one path decreases.

Accordingly, the Ising Hamiltonian, which is the optimization function, is designed so as to take the minimum value when the first constraint condition is satisfied.

It should be noted that the optimization function, which is the output of the optimization function creation apparatus 100, is input to a quantum annealing machine or an Ising machine, for example, and a solution of the bandwidth allocation plan problem can be found as a result of the optimization function being processed by these machines.

According to the embodiment of the present invention, it is possible to create an optimization function for solving a bandwidth allocation plan problem on which a predetermined constraint condition is imposed, the optimization function relating to a variable that represents a quantum state.

SUPPLEMENTARY NOTE

Figure 7:
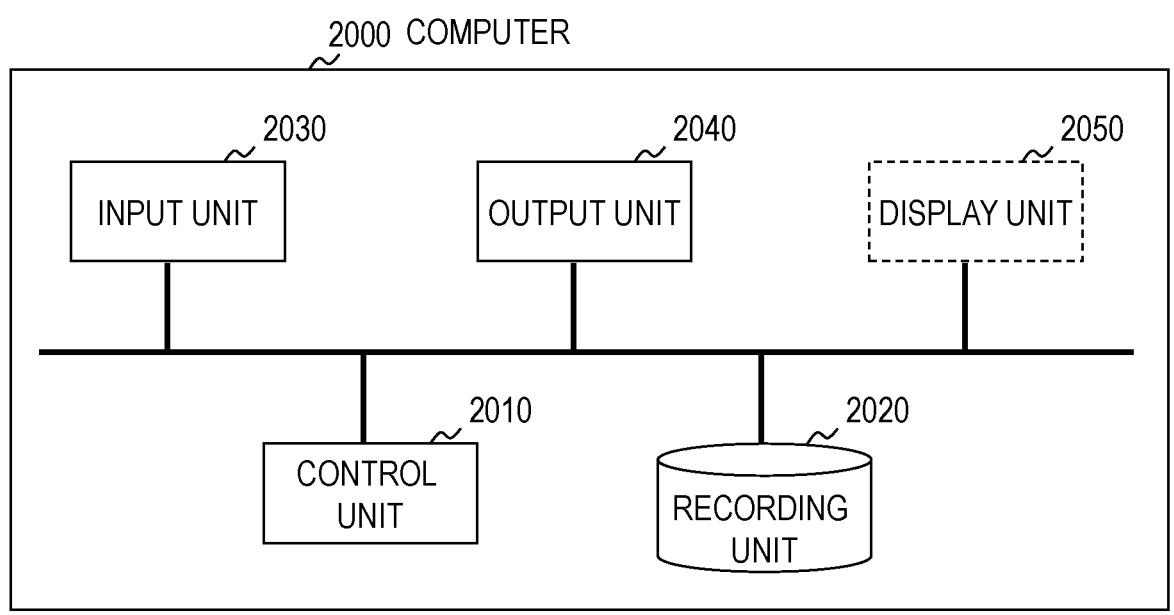
FIG. 7 is a diagram showing an example of a functional configuration of a computer that realizes each apparatus in an embodiment of the present invention.

FIG. 7 is a diagram showing an example of a functional configuration of a computer that realizes each apparatus described above. Processing performed in each apparatus described above can be implemented by causing a recording unit 2020 to read a program for causing the computer to function as the apparatus described above, and causing a control unit 2010, an input unit 2030, an output unit 2040, and the like to operate.

The apparatus according to the present invention is constituted by, for example, a single hardware entity that includes an input unit to which a keyboard or the like can be connected, an output unit to which a liquid crystal display or the like can be connected, a communication unit to which a communication device (e.g., communication cable) that enables communication with the outside of the hardware entity can be connected, a CPU (Central Processing Unit, which may include a cash memory, a register, etc.), RAM and ROM, which are memories, an external storage device that is a hard disk, and a bus that connects the input unit, the output unit, the communication unit, the CPU, the RAM, the ROM, and the external storage device to enable data exchange therebetween. It is also possible to provide the hardware entity with a device (drive) that can read data from and write data into a recording medium such as a CD-ROM, as necessary. An example of a physical entity including these hardware resources is a general-purpose computer.

A program that is necessary to realize the above-described functions and data and the like that are necessary for processing of the program are stored in the external storage device of the hardware entity (the program does not necessarily have to be stored in the external storage device, and may be stored in the ROM, which is a read-only storage device, for example). Data and the like that are obtained in the processing of the program are stored in the RAM or the external storage device as appropriate.

In the hardware entity, each program stored in the external storage device (or ROM, etc.) and data necessary for the processing of the program are read into a memory as necessary, and interpreted, executed, or processed by the CPU as appropriate. As a result, the CPU realizes predetermined functions (the constitutional units described above as units, means, etc.).

The present invention is not limited to the embodiment described above, and can be modified as appropriate within a scope not departing from the gist of the present invention. The pieces of processing described in the above embodiment do not necessarily have to be executed chronologically in the described order, and may be executed in parallel or individually as necessary or according to the processing capacity of the device that executes the processing.

As described above, in a case where processing functions of the hardware entity (apparatus according to the present invention) described in the above embodiment are realized by a computer, the processing content of the functions that are to be included in the hardware entity is described in a program. The processing functions of the hardware entity described above are realized in the computer as a result of the program being executed by the computer.

The program in which the processing content is described can be recorded in a computer-readable recording medium. It is possible to use any computer-readable recording medium such as a magnetic recording device, an optical disk, a magneto-optical recording medium, or a semiconductor memory. Specifically, it is possible to use a hard disk device, a flexible disk, a magnetic tape, or the like as a magnetic recording device, a DVD (Digital Versatile Disc), a DVD-RAM (Random Access Memory), a CD-ROM (Compact Disc Read Only Memory), a CD-R (Recordable)/RW (ReWritable), or the like as an optical disk, an MO (Magneto-Optical disc) or the like as a magneto-optical recording medium, and an EEP-ROM (Electronically Erasable and Programmable-Read Only Memory) or the like as a semiconductor memory.

The program is distributed by, for example, selling, transferring, or lending a portable recording medium such as a DVD or a CD-ROM on which the program is recorded. Furthermore, it is also possible to distribute the program by storing the program in a storage device of a server computer and transferring the program from the server computer to another computer via a network.

A computer that executes such a program initially stores, in a storage device of the computer, the program recorded on a portable recording medium or transferred from a server computer, for example. Then, when executing processing, the computer reads the program stored in the storage device of the computer and executes the processing in accordance with the read program. In another aspect of executing the program, the computer may read the program directly from the portable recording medium and execute the processing in accordance with the program. Alternatively, every time a program is transferred from the server computer to the computer, the computer may execute processing in accordance with the received program. A configuration is also possible in which the processing described above is executed by a so-called ASP (Application Service Provider) type service in which processing functions are realized only by instructing execution of the program and acquiring a result, without the program being transferred from the server computer to the computer. It should be noted that the program in this aspect includes information that is used in processing performed by an electronic computer and is equivalent to a program (e.g., data that is not a direct command for the computer but has the nature of defining processing of the computer).

In this aspect, a computer is caused to execute the predetermined program to constitute the hardware entity, but at least a portion of the processing content may be realized using hardware.

The above description of the embodiment of the present invention is presented for the purpose of illustration and description. The description is not intended to be comprehensive and to limit the present invention to the strict form disclosed. Alterations and variations can be made from the teachings described above. The embodiment was selected and described to provide the best illustration of the principle of the present invention such that those skilled in the art can use the present invention in various embodiments suitable for thoroughly considered practical use, and by adding various alterations. All of such alterations and variations are within the scope of the present invention defined by the appended claims that are interpreted with a fairly, legally, and equitably given range.

The invention claimed is:

1. An optimization function creation apparatus comprising:
    an input setting circuitry configured to set a set Path of paths, a set Edge of edges, a maximum bandwidth Max, a bandwidth p.bandwidth required by a path p($\in$Path), and a set e.paths($\subseteq$Path) of paths that include an edge e($\in$Edge), as input to a bandwidth allocation plan problem for creating a bandwidth allocation plan for paths so as to satisfy a condition (hereinafter referred to as an "optimization condition") of minimizing a bandwidth allocated for the paths of the set Path as a whole under a predetermined constraint condition;
    an optimization function creation circuitry configured to create an optimization function for solving the bandwidth allocation plan problem using the input, the optimization function relating to a variable that represents a quantum state; and
    another circuitry configured to allocate, based on the created optimization function, a minimized bandwidth allocated for the path of the set Path and transmit data through the path of the set Path.

2. The optimization function creation apparatus according to claim 1, wherein
    the constraint condition is a condition (hereinafter referred to as a "first constraint condition") that $|\{p\in e.paths | bottom(p) \leq b < bottom(p) + p.bandwidth\}| \leq 1$ (where bottom(p) represents the lower limit of a bandwidth allocated for the path p) is satisfied with respect to each band b up to the maximum bandwidth Max and each edge e$\in$Edge, and
    the optimization function is a function designed so as to take the minimum value when the first constraint condition is satisfied.

3. The optimization function creation apparatus according to claim 2, wherein
    the variable that represents a quantum state is a quantum bit that represents a particular state by taking the value 1 and represents a state other than the particular state by taking the value 0,
    the optimization function is an objective function of Quadratic Unconstrained Binary Optimization (QUBO) defined based on a function that expresses the first constraint condition and a function that expresses the optimization condition,
    the function expressing the first constraint condition is a function that takes the value 0 when the first constraint condition is satisfied, and otherwise takes a value greater than 0, and
    the function expressing the optimization condition is a function defined such that the value of the function decreases as the total value of bands each allocated for at least one path decreases.

4. The optimization function creation apparatus according to claim 3, wherein
    the variable that represents a quantum state is a variable that is defined so as to represent, with the value 1, a state where a band b is higher than or equal to the lower limit of a bandwidth allocated for a path p.

5. The optimization function creation apparatus according to claim 2, wherein
    the variable that represents a quantum state is a spin that represents a particular state by taking the value 1 and represents a state other than the particular state by taking the value −1,
    the optimization function is an Ising Hamiltonian defined based on a function that expresses the first constraint condition and a function that expresses the optimization condition,
    the function expressing the first constraint condition is a function that takes the value 0 when the first constraint condition is satisfied, and otherwise takes a value greater than 0, and
    the function expressing the optimization condition is a function defined such that the value of the function decreases as a total value of bands each allocated for at least one path decreases.

6. The optimization function creation apparatus according to claim 5, wherein
    the variable that represents a quantum state is a variable that is defined so as to represent, with the value 1, a state where a band b is higher than or equal to the lower limit of a bandwidth allocated for a path p.

7. A non-transitory computer-readable recording medium storing a program for causing a computer to function as the optimization function creation apparatus according to claim 1.

8. A method for creating an optimization function, comprising:
    an input setting step of setting, by an optimization function creation apparatus, a set Path of paths, a set Edge of edges, a maximum bandwidth Max, a bandwidth p.bandwidth required by a path p($\in$Path), and a set e.paths($\subseteq$Path) of paths that include an edge e($\in$Edge), as input to a bandwidth allocation plan problem for creating a bandwidth allocation plan for paths so as to satisfy a condition (hereinafter referred to as an "optimization condition") of minimizing a bandwidth allocated for the paths of the set Path as a whole under a predetermined constraint condition;
    an optimization function creating step of creating, by the optimization function creation apparatus, an optimization function for solving the bandwidth allocation plan problem using the input, the optimization function relating to a variable that represents a quantum state; and
    an allocating and transmit step of allocating, based on the created optimization function, a minimized bandwidth allocated for the path of the set Path and transmit data through the path of the set Path.

* * * * *